United States Patent [19]

Ishiyama

[11] Patent Number: 5,344,126
[45] Date of Patent: Sep. 6, 1994

[54] VIBRATION ISOLATION APPARATUS
[75] Inventor: Tatsuro Ishiyama, Yokohama, Japan
[73] Assignee: Bridgestone Corporation, Tokyo, Japan
[21] Appl. No.: 851,008
[22] Filed: Mar. 11, 1992

[30] Foreign Application Priority Data

Mar. 15, 1991 [JP] Japan .................................. 3-051657
Apr. 25, 1991 [JP] Japan .................................. 3-095572

[51] Int. Cl.⁵ .......................... F16M 1/00; F16F 5/00
[52] U.S. Cl. ................................ 267/140.12; 267/219
[58] Field of Search .............. 267/140.12, 219, 140.11; 180/300, 312, 902; 248/562, 636, 638

[56] References Cited

U.S. PATENT DOCUMENTS

| | | | |
|---|---|---|---|
| 4,884,789 | 12/1989 | Takeda et al. | 267/140.12 |
| 4,893,798 | 1/1990 | Hibi et al. | 267/140.12 |
| 4,923,178 | 5/1990 | Matsumoto et al. | 267/140.12 |
| 5,098,072 | 3/1992 | Muramatsu et al. | 267/140.12 |

FOREIGN PATENT DOCUMENTS

| | | |
|---|---|---|
| 199240 | 10/1986 | European Pat. Off. . |
| 411997 | 2/1991 | European Pat. Off. . |
| 3722079 | 1/1988 | Fed. Rep. of Germany . |
| 3909852 | 3/1990 | Fed. Rep. of Germany . |
| 3831645 | 4/1990 | Fed. Rep. of Germany . |
| 3931387 | 4/1990 | Fed. Rep. of Germany . |
| 62-224746 | 10/1987 | Japan . |
| 63-214531 | 9/1988 | Japan . |
| 1-182645 | 7/1989 | Japan . |
| 2-42226 | 2/1990 | Japan . |
| 2-42227 | 2/1990 | Japan . |

Primary Examiner—Douglas C. Butler
Attorney, Agent, or Firm—Oliff & Berridge

[57] ABSTRACT

A vibration isolation apparatus comprises an outer cylinder, an inner cylinder, an elastic member disposed between the outer and inner cylinders and deforming when vibration is generated, a main fluid chamber able to expand and contract according to deformation of the elastic member, an auxiliary fluid chamber able to expand and contract according to deformation of a membrane, and a restricted path communicating between the main and auxiliary fluid chambers. The main and auxiliary fluid chambers are communicated with each other around the inner cylinder. The restricted path is disposed at sides in the axial direction of main and auxiliary fluid chambers. Therefore, the restricted paths can be connected to the main and auxiliary fluid chambers at the positions where the fluid chambers are separated farthest from each other. As a result, the restricted paths can be extended.

21 Claims, 10 Drawing Sheets

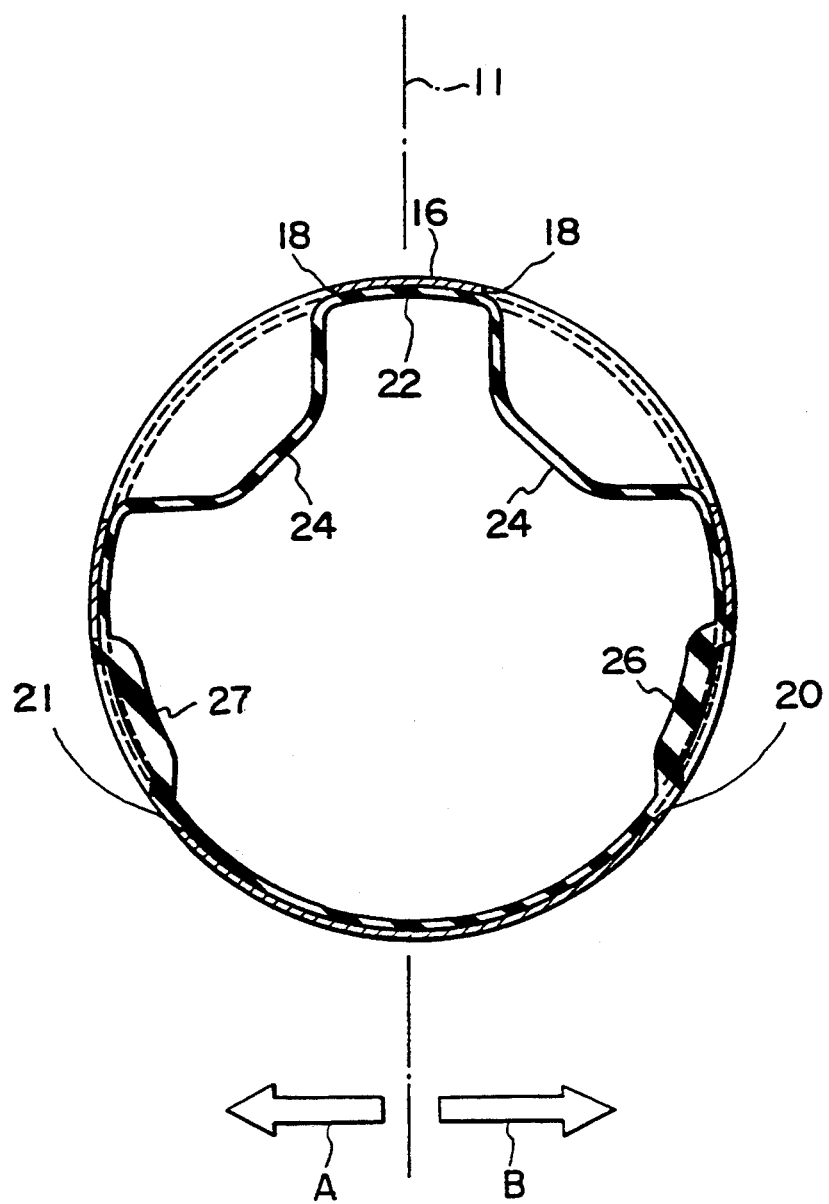

FIG. 4
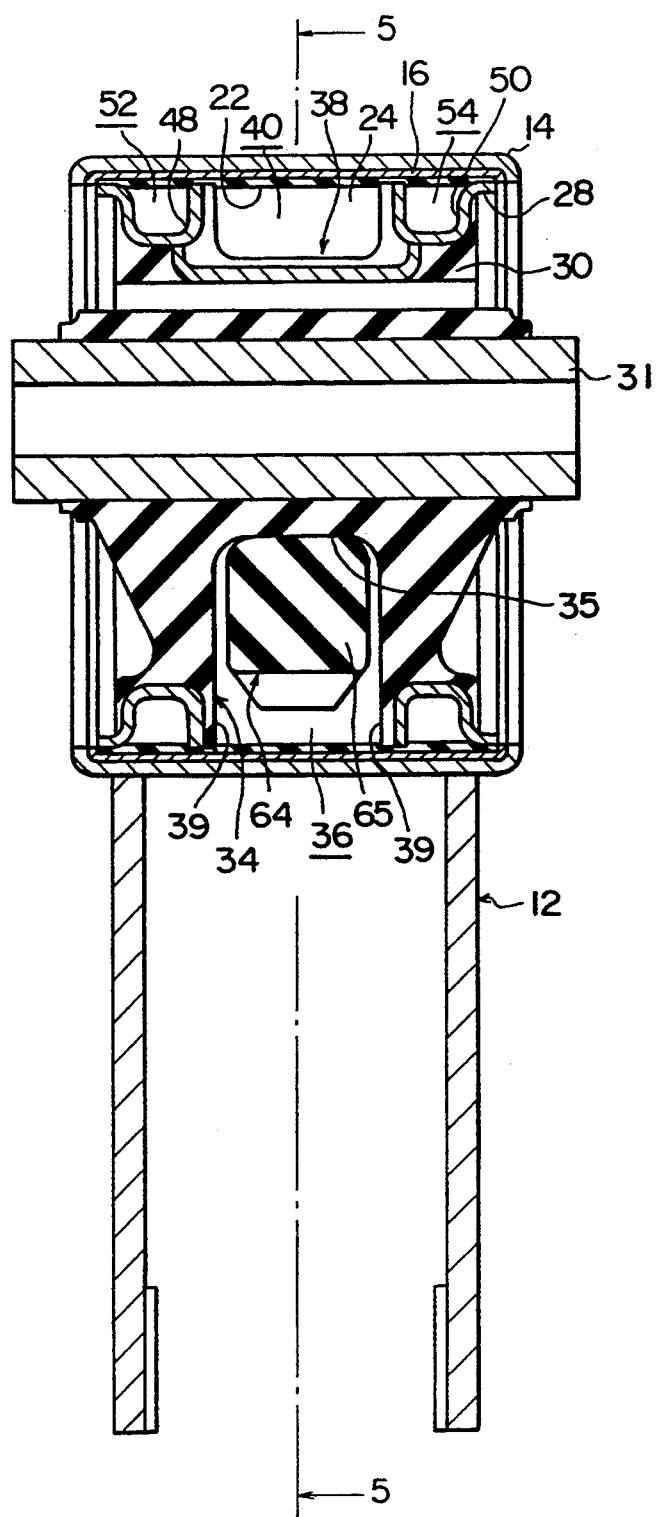
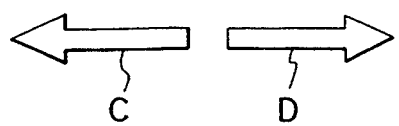

VIBRATION ISOLATION APPARATUS

BACKGROUND OF THE INVENTION

1. Field of the Invention

The present invention relates to a fluid filled-type vibration isolation apparatus which absorbs vibration form a vibration generating portion such as an engine.

2. Description of the Related Art

A vibration isolation apparatus is disposed as an engine mount between an engine and a vehicle body in the vehicle engine room. The vibration isolation apparatus inhibits transmission of vibration from the engine to the vehicle body. The engine vibrates in various modes of vibration. For example, shake vibration has a frequency of less than 15 Hz. Idle vibration has a frequency range in the vicinity of 20 to 40 Hz. High-frequency vibration has a frequency of greater than or equal to 80 Hz. A fluid filled-type vibration isolation apparatus having a plurality of fluid chambers is disclosed in Japanese Patent Application Laid-Open Nos. 2-42226 and 2-42227 as a vibration isolation apparatus which absorbs vibrations of a wide range of frequencies such as those listed above.

This vibration isolation apparatus has three fluid chambers layered one after another and disposed at one side of an inner cylinder. A communication path, i.e., a restricted path, is disposed on the other side of the inner cylinder to communicate the fluid chambers with each other. Therefore, the complex internal structure of the apparatus complicates assembling. To effectively absorb idle vibration from the engine, it is necessary to increase flow resistance and resonance of the fluid which are both caused when the fluid flows through the communication path. Thus, the communication path should be extended in order top increase the flow resistance and resonance of the fluid. In this vibration isolation apparatus, however, the fluid chambers should be provided so as not to interfere with each other. Therefore, it is impossible to extend the length of the communication path. As a result, flow resistance and resonance of the fluid cannot be increased much more. Of course, the communication path can be lengthened by separately mounting an other member to form the communication path. Such an extension, however, results in an even more complex structure and difficult assembly of the vibration isolation apparatus.

SUMMARY OF THE INVENTION

In view of the facts set forth above, an object of the present invention is to provide a vibration isolation apparatus having an extended communication path which communicates with fluid chamber to improve absorption of vibrations, and having a simple structure.

According to one preferred embodiment of the present invention the vibration isolation apparatus comprises an inner cylinder connected to one of a vibration generating portion and a vibration receiving portion, an outer cylinder connected to the other of the vibration generating portion and the vibration receiving portion, an elastic member provided between the inner cylinder and the outer cylinder and deforming when vibration is generated, at least one first fluid chamber able to expand and contract according to deformation of the elastic member, at least one second fluid chamber able to expand and contract according to deformation of a diaphragm or a membrane or the like, and a restricted path disposed between the elastic member and the outer cylinder and communicating the first and second fluid chambers with each other. The fluid chambers are provided around the inner cylinder so as to communicate with each other. The restricted paths are axially disposed adjacent to the fluid chambers.

In the vibration isolation apparatus constructed as set forth above, for example, the outer cylinder is connected to the vibration receiving portion, and the inner cylinder is connected to the vibration generating portion. Thus, vibration generated by the vibration generating portion can be transmitted to the outer cylinder through the elastic member. The vibration is absorbed by frictional resistance in the elastic member. The vibration is further absorbed by flow resistance or resonance of the fluid which are generated when the fluid flows through the restricted paths which communicate between the first and second fluid chambers. In addition, the restricted paths are provided adjacent to the first and second fluid chambers which communicate with each other. Thus, connecting portions of the restricted paths, which communicate with the first and second fluid chambers, can be separated farthest form each other on the side of the fluid chambers. Consequently, the restricted path is extended to increase flow resistance or resonance of the fluid. Further, because the restricted paths are provided adjacent to the first and second fluid chambers, the vibration isolation apparatus has a simple internal structure.

According to another preferred embodiment of the present invention, the vibration isolation apparatus comprises an inner cylinder connected to one of a vibration generating portion and a vibration receiving portion, an outer cylinder connected to the other of the vibration generating portion and the vibration receiving portion, an elastic member disposed between the inner cylinder and the outer cylinder and deforming when vibration is generated, a main fluid chamber having the elastic member serving as at least a part of a wall thereof and able to expand and contract, an auxiliary fluid chamber communicated with the main fluid chamber, and disposed on one side of a predetermined axis of symmetry extending across an axis of the outer cylinder and an axis of the inner cylinder as viewed in the axial direction of the outer and inner cylinders, the auxiliary fluid chamber being defined by the outer cylinder and a first concave portion formed in the elastic member and opening toward the side of the outer cylinder, and a first membrane provided at the outer cylinder and facing the auxiliary chamber and elastically deforming. The vibration isolation apparatus also comprises a second concave portion disposed at the side opposite to the first concave portion with respect to the axial of symmetry and formed in the elastic member and opening toward the side of the outer cylinder, and a second membrane provided at the outer cylinder on a side opposite to the first membrane with respect to the axis of symmetry and having a form symmetrical to that of the first membrane with respect to the axis of symmetry.

In the vibration isolation apparatus having the abovementioned construction, for example, the outer cylinder is connected to the vibration receiving portion, and the inner cylinder is connected to the vibration generating portion. Thus, vibration generated by the vibration generating portion is transmitted to the outer cylinder through the elastic member. The vibration is absorbed by frictional resistance in the elastic member. The vibration is further absorbed by flow resistance or resonance of the fluid which are generated when the fluid flows between the main fluid chamber and auxiliary fluid chamber.

In addition, the elastic member has the first concave portion and the second concave portion disposed on opposite sides with respect to the axis of symmetry. The outer cylinder has the first membrane and the second membrane disposed on opposite sides with respect to the axis of symmetry. Thus, when the elastic member is inserted into the outer cylinder, it is not necessary to first the respective right and left sides of the elastic member with those of the outer cylinder. Accordingly, special attention is not necessary during assembly. Further, it is possible to avoid having to reassemble the parts due to incorrect assembly.

As a result, the vibration isolation apparatus of the present invention has a simple structure and provides a superior effect in that absorption of vibration can be improved by means of an extended communication path.

BRIEF DESCRIPTION OF THE DRAWINGS

FIG. 2 is a sectional view taken along line 2—2 of FIG. 1, illustrating an outer cylinder and a thin rubber layer of the first embodiment of the vibration isolation apparatus of the present invention;

FIG. 4 is a sectional view taken along line 4—4 of FIG. 5, illustrating the first embodiment of the vibration isolation apparatus of the present invention;

DESCRIPTION OF THE PREFERRED EMBODIMENTS

Referring to FIGS. 1 through 8, a first embodiment of a vibration isolation apparatus 10 of the present invention will be described.

Figure 1:
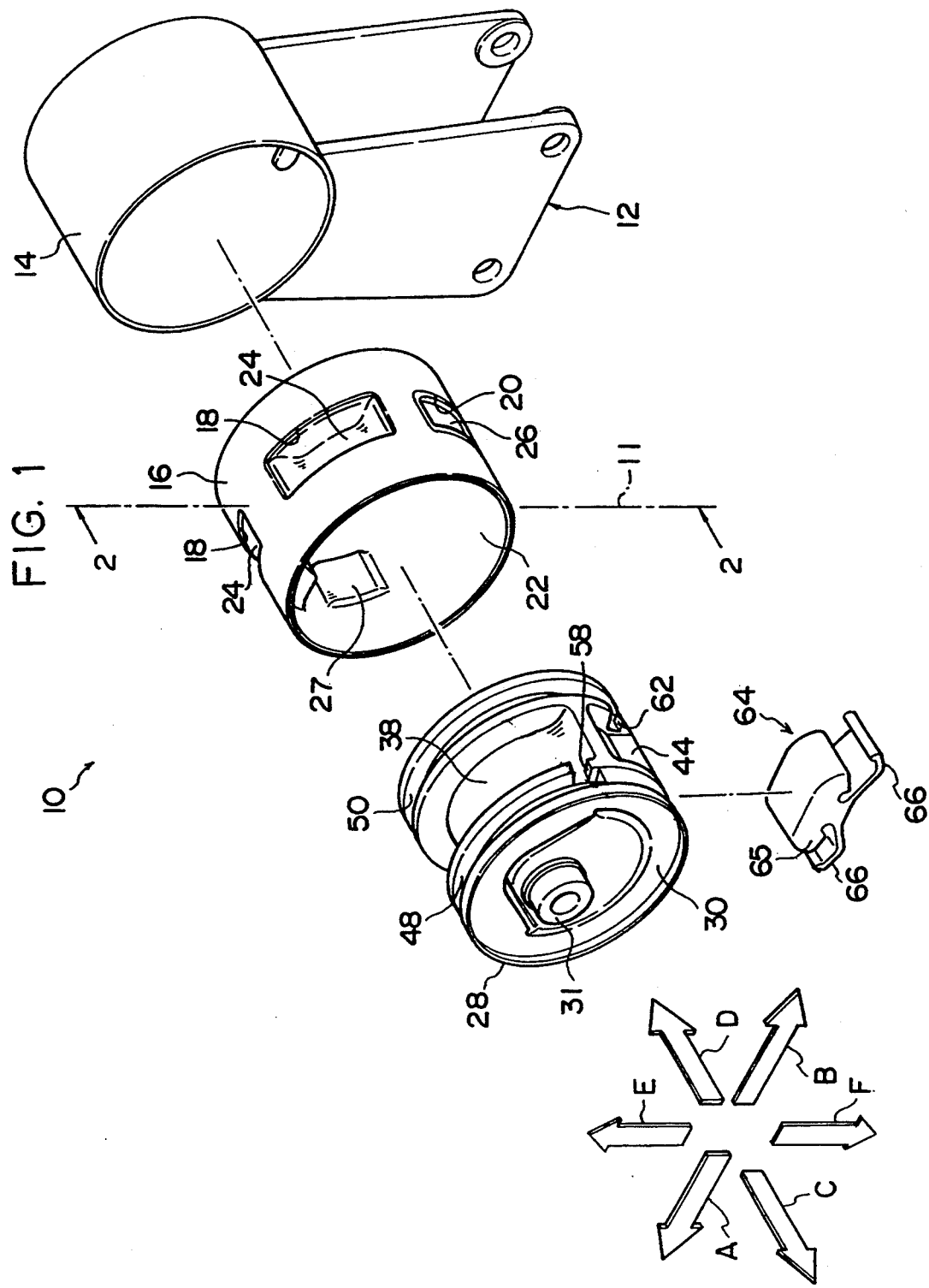
FIG. 1 is an exploded perspective view illustrating a first embodiment of a vibration isolation apparatus of the present invention.

As shown in FIG. 1, the vibration isolation apparatus 10 has a mounting frame 12 which is used for mounting the vibration isolation apparatus 10 on a vehicle body (not shown). An outer cylinder 16 is inserted into an annular portion 14 of the mounting frame 12. In this embodiment, the outer cylinder 16 may either be forced into or inserted without pressure into the annular portion 14. Thereafter, the outer cylinder 16 is secured to the annular portion 14 by applying caulking on inner sides of both ends of the annular portion 14. The outer cylinder 16 may be fixed in the annular portion 14 simply by being forced therein.

As shown in FIGS. 1 and 2, the outer cylinder 16 has a pair of rectangular openings 18 on the upper left and right sides thereof (left and right being denoted by arrows A, B) with respect to an axis of symmetry 11. The axis of symmetry 11 extends across an axis of the outer cylinder 16 and longitudinally extends up and down in FIG. 1 (in the directions of arrows E, F in FIG. 1). The outer cylinder 16 has a small rectangular opening 21 which is provided on the lower side thereof and to the left with respect to the axis of symmetry 11 (in the direction of the arrow A). Additionally, the outer cylinder 16 has a small rectangular opening 20 which is provided on the lower side thereof and to the right with respect to the axis of symmetry 11 (in the direction of the arrow B). Further, a thin rubber membrane 22 is bonded by vulcanization to an inner periphery of the outer cylinder 16. The thin rubber membrane 22 protrudes inward at each portion corresponding to the rectangular openings 18 and is defined as a diaphragm 24. Furthermore, the thin rubber membrane 22 protrudes inward at a portion corresponding to the small rectangular opening 20 and is defined as a membrane 26 serving as a first membrane. The thin rubber membrane 22 protrudes inward at a portion corresponding to the small rectangular opening 21 and is defined as a membrane 27 serving as a second membrane. The membranes 26, 27 are disposed symmetrically with respect to the axis of symmetry 11. In addition, the membranes 26, 27 have thicker walls than those of the diaphragms 24 and are more rigid than the diaphragms 24.

Figure 3A:
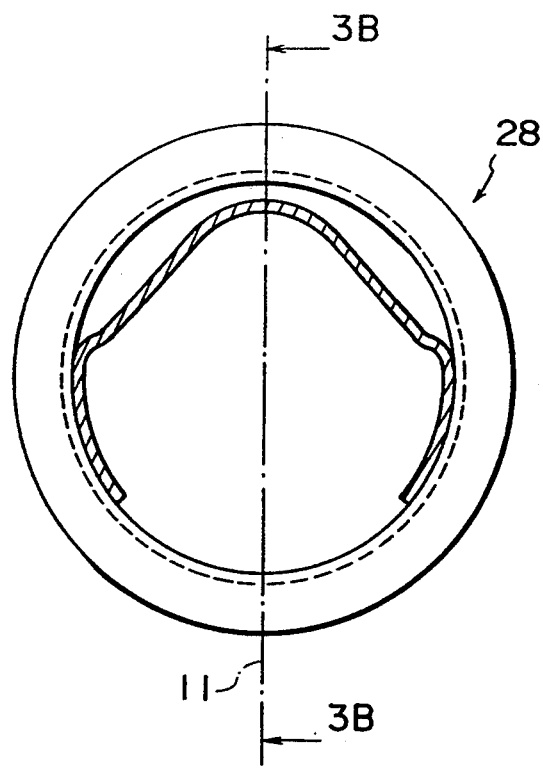
FIG. 3A is a sectional view taken along line 3A—3A of FIG. 3B, illustrating an intermediate cylinder of the first embodiment of the vibration isolation apparatus of the present invention.
Figure 3B:
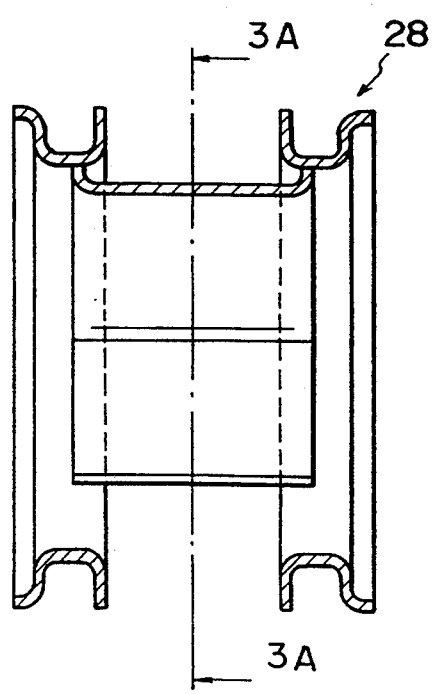
FIG. 3B is a sectional view taken along line 3B—3B of FIG. 3A, illustrating the intermediate cylinder of the first embodiment of he vibration isolation apparatus of the present invention.

An intermediate cylinder 28 is inserted coaxially into the outer cylinder 16. The intermediate cylinder 28 is formed of a steel plate. As shown in FIGS. 3A, 3B, the intermediate cylinder 28 has a pair of rings with substantially U-shaped cross sections. The pair of rings are connected with each other by means of a connecting plate having a substantially semicircular form.

As shown in FIG. 4, an elastic member 30 is bonded by vulcanization to the inner periphery of the intermediate cylinder 28. An inner cylinder 31 is axially disposed at a substantially intermediate position of the elastic member 30. Additionally, the intermediate cylinder 28 is inserted into the outer cylinder 16 and is pressed. Thereafter, both ends of the outer cylinder 16 are caulked so that the intermediate cylinder 28 is secured in the outer cylinder 16.

Figure 5:
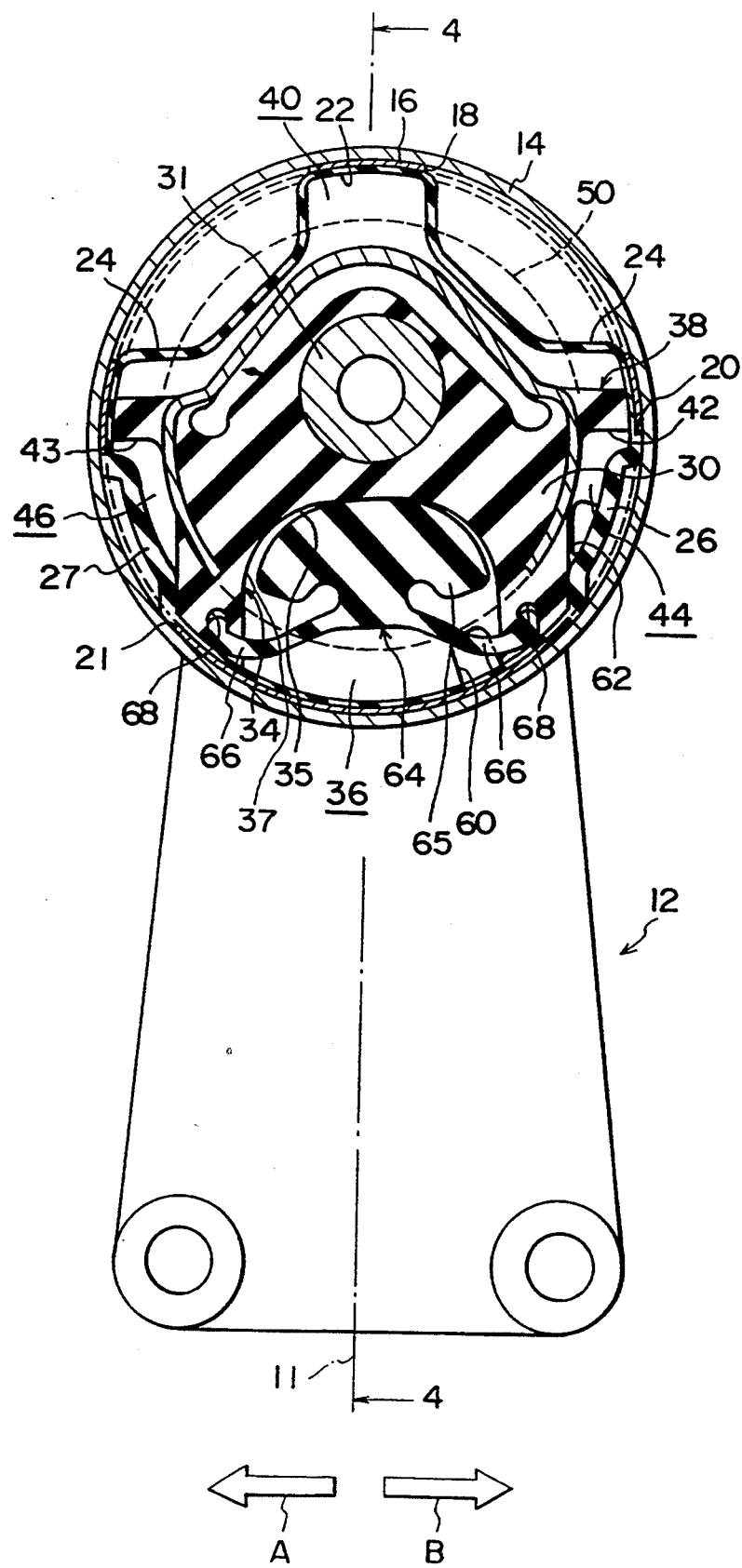
FIG. 5 is a sectional view taken along line 5—5 of FIG. 4, illustrating the first embodiment of the vibration isolation apparatus of the present invention.

A concave portions 34 is formed in the elastic member 30 under the inner cylinder 31 at an axially intermediate position of the elastic member 30. The concave portion 34 and the outer cylinder 16 define a pressure receiving fluid chamber 36 serving as a main fluid chamber. As shown in FIG. 5, a bottom surface 35 of the concave portion 34 has a substantially circular cross section perpendicular to the axis.

A movable body 64, which is formed of an elastic member such as rubber, is disposed in the pressure receiving fluid chamber 36. The movable body 64 has a movable portion 65, a pair of supporting legs 66 extending from the lower section of the movable portion 65. A top surface of the movable portion 65 has a configuration which substantially corresponds to the bottom surface 35 of the concave portion 34 as viewed in the axial direction. Further, as the top surface of the movable portion 65 moves toward side walls 39 of the concave portion 34, the top surface is gradually separated from the bottom surface 35. End portions of the supporting legs 66 are inserted and fixed into concave portions 68. The concave portions 68 are provided in the vicinity of the opening portion of the concave portion 34 of the elastic member 30. The movable portion 65 is urged toward the bottom surface 35 side of the concave portion 34 by an urging force of the supporting legs 66. The top surface of the movable portion 65 is lightly pressed at a central portion thereof by the bottom surface 35. In addition, as shown in FIG. 5, both side surfaces of the movable portion 65 in the axial direction are spaced at predetermined intervals from the side walls 39 of the concave portion 34.

The elastic member 30 has a concave portion 38 extending along the circumference at an axially intermediate portion above the elastic member 30 as shown in FIG. 4. A first auxiliary fluid chamber 40 is defined by the concave portion 38, the intermediate cylinder 28, and the diaphragm 24. A space between the diaphragm 24 and the outer cylinder 16 is defined as an air chamber. The air chamber may communicate with the outside by means of a hole (not shown) which is provided in the annular portion 14 of the mounting frame 12.

A small concave portion 42, serving as a first concave portion, is formed between the concave portions 34 and 38 at an outer periphery of the elastic member 30 on the right side of FIG. 5. The membrane 26 is fitted into the small concave portion 42. A second auxiliary fluid chamber 44, serving as an auxiliary fluid chamber, is defined by the small concave portion 42, the outer cylinder 16, and the membrane 26. Further, a small concave portion 43, serving as a second concave portion is formed between the concave portions 34 and 38 at the outer periphery of the elastic member 30 on the left side of FIG. 5. The membrane 27 is fitted into the small concave portion 43. The small concave portion 43, the membrane 27, and the outer cylinder 16 define a dummy fluid chamber 46 which does not communicate with any other fluid chamber.

A space between the membrane 26 and the outer cylinder 16 is defined as an air chamber. The air chamber may communicate with the outside by means of a hole (not shown) which is provided in the annular portion 14 of the mounting frame 12.

Figure 6:
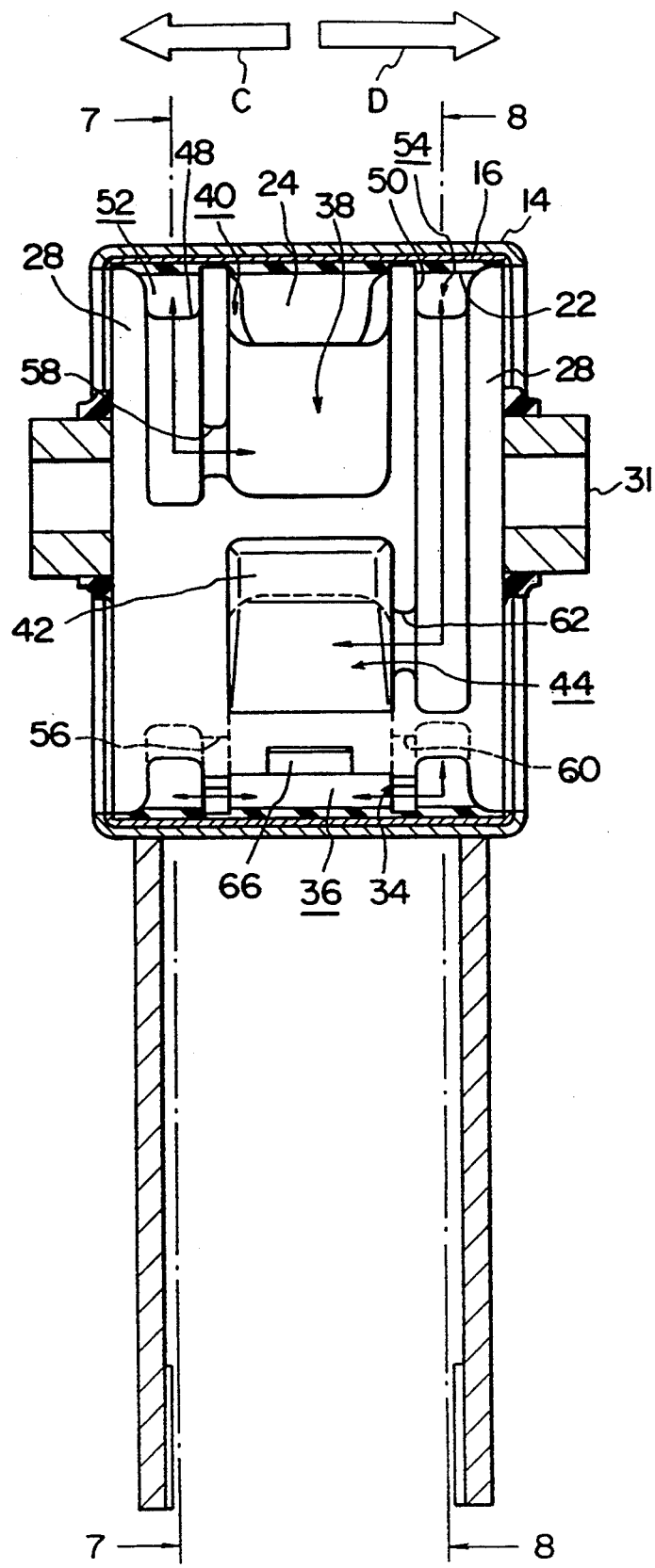
FIG. 6 is a partial sectional view corresponding to FIG. 4, illustrating the first embodiment of the vibration isolation apparatus of the present invention.

As shown in FIG. 6, annular grooves 48, 50 provided by the rings of the intermediate cylinder 28 are provided on both sides in the axial direction of the concave portions 34, 38, and the small concave portion 42. The annular grooves 48, 50 are blocked by the outer cylinder 16 and are sealed off from the outside. Thus, the annular groove 48 is defined as a first communication path 52, serving as a first restricted path, on the left side of FIG. 6 (on the side in the direction of arrow C in FIG. 6). The annular groove 50 is defined as a second communication path 54, serving as a second restricted path, on the right side of FIG. 6 (on the side in the direction of arrow D in FIG. 6).

Figure 7:
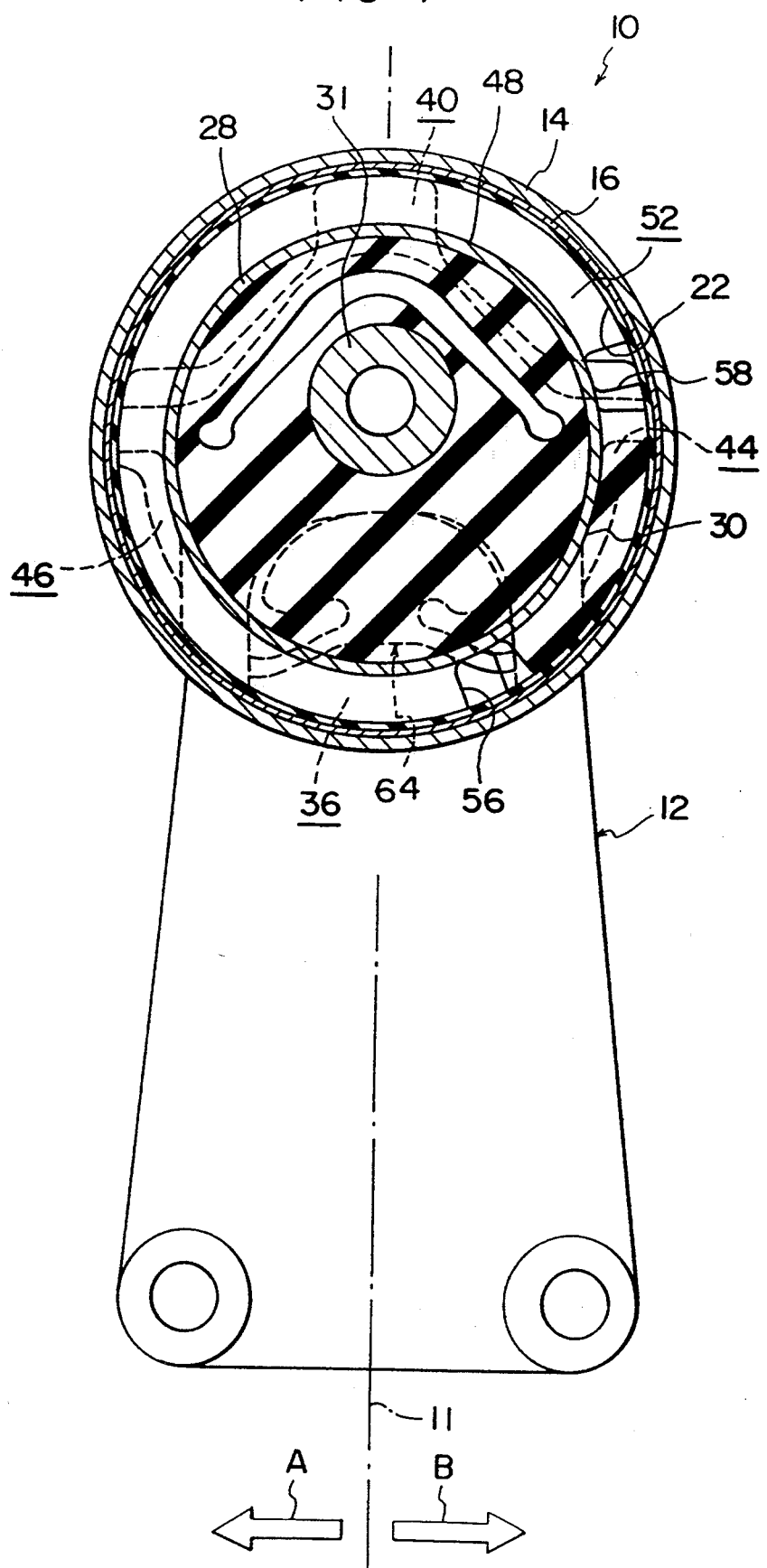
FIG. 7 is a sectional view taken along line 7—7 of FIG. 6, illustrating the first embodiment of the vibration isolation apparatus of the present invention.

As shown in FIG. 7, the first communication path 52 is partially blocked by the elastic member 30 and has a C-shaped cross section perpendicular to the axis. One of the ends of the first communication path 52 communicates with the pressure receiving fluid chamber 36 through a hole 56. The hole 56 is provided at an end of the pressure receiving fluid chamber 36 at the second auxiliary fluid chamber 44 side. The other end of the first communication path 52 communicates with the first auxiliary fluid chamber 40 through a hole 58. The hole 58 is provided at an end of the first auxiliary fluid chamber 40 at the second auxiliary fluid chamber 44 side.

Figure 8:
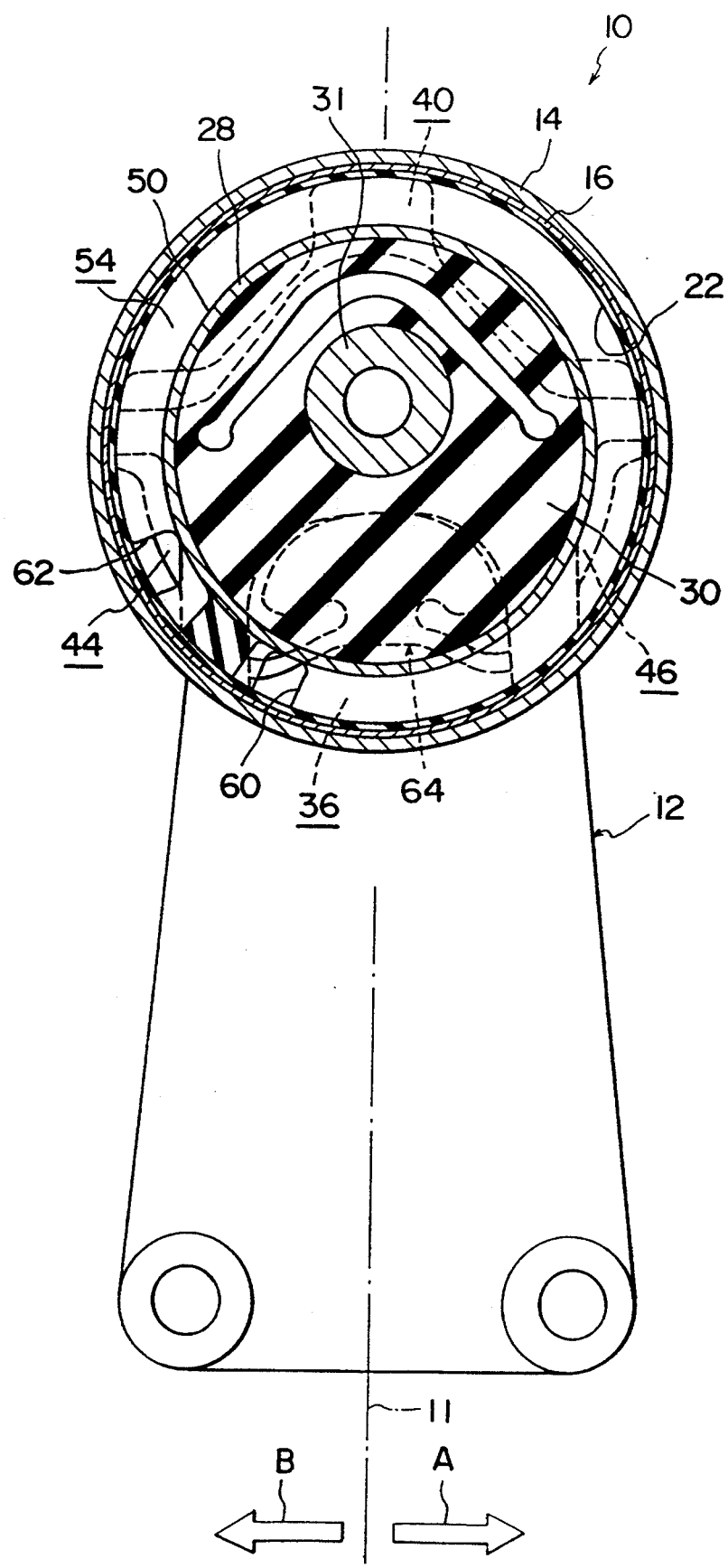
FIG. 8 is a sectional view taken along line 8—8 of FIG. 6, illustrating the first embodiment of the vibration isolation apparatus of the present invention.

As shown in FIG. 8, the second communication path 54 is partially blocked by the elastic member 30 and has a C-shaped cross section perpendicular to the axis. One of the ends of the second communication path 54 communicates with the pressure receiving fluid chamber 36 through a hole 60. The hole 60 is provided at an end of the pressure receiving fluid chamber 36 at the second auxiliary fluid chamber 44 side. The other end of the second communication path 54 communicates with the second auxiliary fluid chamber 44 through a hole 62. The hole 62 is provided at an end of the second auxiliary fluid chamber 44 at the pressure receiving fluid chamber 36 side.

Fluid such as water or oil is filled into the pressure receiving fluid chamber 36, the first auxiliary fluid chamber 40, the second auxiliary fluid chamber 44, the first communication path 52, and the second communication path 54.

Next, the order of assembly of the vibration isolation apparatus 10 will be described.

As shown in FIG. 1, the inner cylinder 31, the elastic member 30, and the intermediate cylinder 28 are integrally assembled into a block. The block is inserted into the outer cylinder 16 in the fluid. In addition, the elastic member 30 has the small concave portions 42, 43 which are opposed to each other with respect to the axis of symmetry 11. The outer cylinder 16 has the membranes 26, 27 which are opposed to each other with respect to the axis of symmetry 11. Thus, when the elastic member 30 is inserted into the outer cylinder 16, it is not necessary to fit the respective right and left sides of the elastic member 30 with those of the outer cylinder 16. Accordingly, special attention is not necessary during assembly. Further, it is possible to avoid having to reassemble the parts due to incorrect assembly. The fluid such as water or oil is filled all throughout the pressure receiving fluid chamber 36, the first auxiliary fluid chamber 40, the second auxiliary fluid chamber 44, the first communication path 52, and the second communication path 54 so that no air is included. Next, the outer cylinder 16 is pressed, and thereafter, both ends of the outer cylinder 16 are caulked. The caulked outer cylinder 16 may be forced into or inserted without pressure into the annular portion 14 of the mounting frame 12. Both ends of the annular portion 14 are caulked to complete the vibration isolation apparatus 10. When the outer cylinder 16 is forced into the annular portion 14, it is not necessary to caulk both ends of the annular portion 14.

Operation of the first embodiment will be described hereinafter.

The mounting frame 12 is mounted on a vehicle body (not shown), and the inner cylinder 31 is connected to an unillustrated vehicle engine. Accordingly, the engine vibration is transmitted to the vehicle body (not shown) through the inner cylinder 31, the elastic member 30, the outer cylinder 16, and the mounting frame 12. At this time, the elastic ember 30 is elastically deformed so that the engine vibration is absorbed by damping based on frictional resistance in the elastic member 30.

When the vibration of the engine is of a comparatively low frequency (for example, shake vibration of less than 15 Hz and an amplitude of approximately ±1 mm), the fluid in the pressure receiving fluid chamber 36 flows back and forth between the pressure receiving fluid chamber 36 and the first auxiliary fluid chamber 40 through the first communication path 52. At this time, the membrane 26 of the second auxiliary chamber 44 barely deforms. The volume of the second auxiliary fluid chamber 44 varies slightly. Thus, the fluid does not flow through second communication path 54 since the membrane 26 of the second auxiliary fluid chamber 44 is more rigid than the diaphragms 24 of the first auxiliary fluid chamber 40. Therefore, the shake vibration is absorbed by flow resistance or resonance of the fluid which are caused when the fluid flows through the first communication path 52.

When the vibration of the engine is of a comparatively high frequency (for example, idle vibration of 20 to 40 Hz), the first communication path 52 is set in a blocked condition. Consequently, the fluid in the pressure receiving fluid chamber 36 flows through the second communication path 54 to deform the membrane 26. The fluid flows back and forth between the pressure receiving fluid chamber 36 and the second auxiliary fluid chamber 44. As a result, the idle vibration can be absorbed by flow resistance or resonance of the fluid which are caused when the fluid flows through the second communication path 54.

Further, when the vibration of the engine is of a higher frequency (for example, high-frequency vibration of greater than or equal to 80 Hz which causes a booming sound), the second communication path 54, as well as the first communication path 52, are set in the blocked condition. However, resonance of the fluid is caused between the movable body 64 and the inner periphery of the pressure receiving fluid chamber 36 to decrease amplification of vibration in the high frequency band.

As can be understood from the above description, two fluid chambers can communicate with each other through a communication path while other fluid chambers have no effect on the communication path. Further, because the communication path is disposed at the side of the fluid chamber, the communication path can be connected to the two fluid chambers at positions at which the fluid chambers are separated the most from each other. Accordingly, this vibration isolation apparatus can have a communication path which is longer than that of apparatus in the prior art by at least a length corresponding to the length of the fluid chamber. Therefore, it is possible to increase flow resistance and resonance of the fluid which are caused when the fluid flows through the communication path. Further, shake vibration and idle vibration can be effectively absorbed as compared to conventional vibration isolation apparatus. Additionally, the elastic member 30 has the pressure receiving fluid chamber 36, the first auxiliary fluid chamber 40, the second auxiliary fluid chamber 44, the first communication path 52, and the second communication path 54, all on the side of the outer periphery of the elastic member 30. Therefore, the vibration isolation apparatus of the present invention has a simple structure and is easy to assemble.

Figure 9:
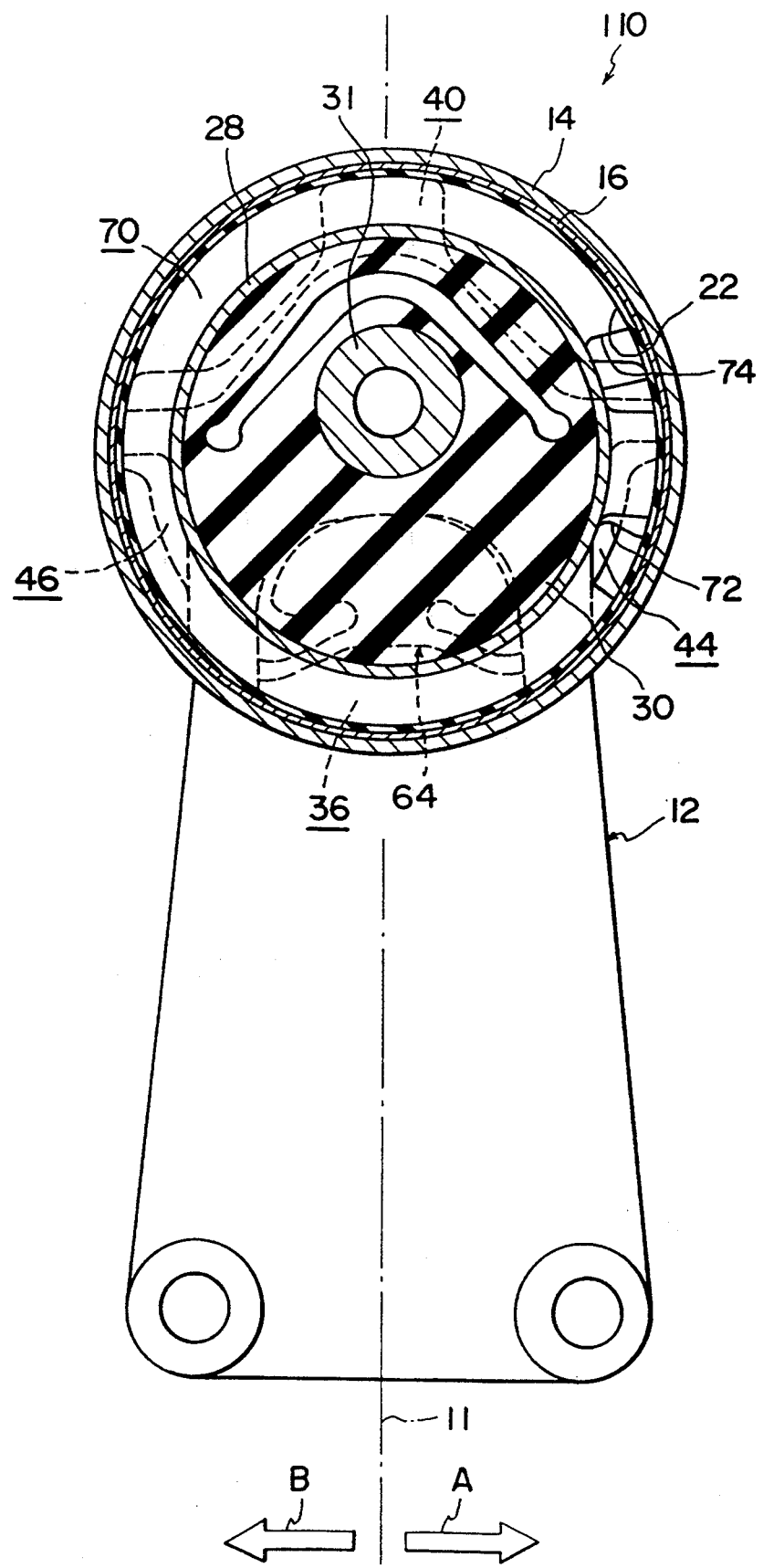
FIG. 9 is a sectional view taken along line 9—9 of FIG. 10, illustrating a second embodiment of a vibration isolation apparatus of the present invention
Figure 10:
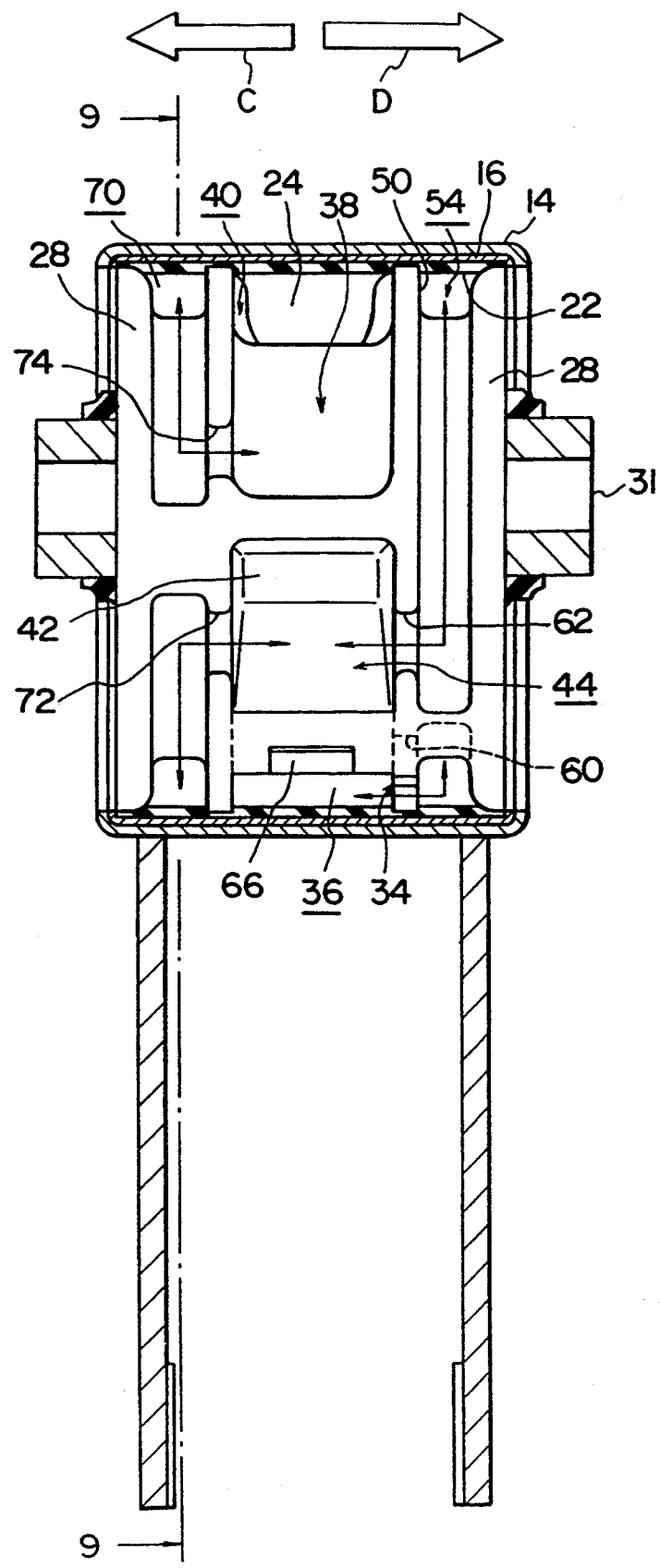
FIG. 10 is a partial sectional view illustrating the second embodiment of the vibration isolation apparatus of the present invention.

Referring to FIGS. 9 and 10, a second embodiment of a vibration isolation apparatus 110 of the present invention will be described. For structures which are identical to those shown in the first embodiment, the same reference numerals are used, and descriptions of the similar structures are omitted.

As shown in FIG. 9, a first communication path 70 of the second embodiment has a C-shaped cross section perpendicular to the axis. As shown in FIGS. 9 and 10, one of the ends of the first communication path 70 communicates with the second auxiliary fluid chamber 44 through a hole 72. The hole 72 is provided at the end of the second auxiliary fluid chamber 44 at the first auxiliary fluid chamber 40 side. The other end of the first communication path 70 communicates with the first auxiliary fluid chamber 40 through a hole 74. The hole 74 is provided at the end of the first auxiliary fluid chamber 40 at the second auxiliary fluid chamber 44 side.

Namely, in the second embodiment, the vibration isolation apparatus 110 has the pressure receiving fluid chamber 36 which communicates with the first auxiliary fluid chamber 40 through the second communication path 54, the second auxiliary fluid chamber 44, and the first communication path 70 in that order.

Operation of the second embodiment will be described hereinafter.

When the vibration of the engine is of a comparatively low frequency (for example, shake vibration of less than 15 Hz and an amplitude of approximately ±1 mm), the vibration causes pressure in the pressure receiving fluid chamber 36 to increase. Consequently, the fluid in the pressure receiving fluid chamber 36 flows back an forth between the pressure receiving fluid chamber 36 and the first auxiliary fluid chamber 40 through the second communication path 54, the second auxiliary fluid chamber 44, and the first communication path 70. Thus, the shake vibration an be absorbed by flow resistance or resonance of the fluid which are caused when the fluid flows between the pressure receiving fluid chamber 36 and the first auxiliary fluid chamber 40. Since the length from the pressure receiving fluid chamber 36 to the first auxiliary fluid chamber 40 is made longer, the shake vibration can be much more effectively absorbed than in the vibration isolation apparatus 10 in the first embodiment.

When the vibration of the engine is of a comparatively high frequency (for example, idle vibration of 20 to 40 Hz), the first communication path 70 is set in the blocked condition. Consequently, the fluid in the pressure receiving fluid chamber 36 flows back and forth between the pressure receiving fluid chamber 36 and the second auxiliary fluid chamber 44 through the second communication path 54. As a result, the idle vibration is absorbed by flow resistance or resonance of the fluid which are caused when the fluid flows through the second communication path 54.

Further, when the vibration of the engine is of a higher frequency (for example, high-frequency vibration of greater than or equal to 80 Hz which causes a booming sound), the second communication path 54, as well as the first communication path 70, are set in the blocked condition. However, the fluid in the pressure receiving fluid chamber 36 flows back and forth between the movable body 643 and the inner periphery of the pressure receiving fluid chamber 36. As a result, amplification of vibration in the high frequency band can be decreased.

Sectional areas of the first and second communication paths 70, 54 are variable in order to adjust resonance characteristics of the fluid.

In the present embodiment, the movable body 64 is disposed in the pressure receiving fluid chamber 36 so as to decrease the amplification of vibration in high frequency band. However, it must be noted that the present invention should not be omitted to the present embodiment and may employ any other means, such as a diaphragm for absorbing high frequency.

In the first and second embodiments, the second auxiliary fluid chamber 44 communicates with the pressure receiving fluid chamber 36 yet does not do so through the other fluid chamber (the first auxiliary fluid chamber 40). In the present invention, however, the second auxiliary fluid chamber 44 may communicate with the pressure receiving fluid chamber 36 through the other fluid chamber (the first auxiliary fluid chamber 40).

As can be understood from the above first and second embodiments, the vibration isolation apparatus of the invention has superior effects in that special attention is not required during assembly and in that assembly can be performed efficiently.

What is claimed is:

1. A vibration isolation apparatus comprising:
   an inner cylinder connected to one of a vibration generating portion and a vibration receiving portion, said inner cylinder having a first and second end portions;
   an outer cylinder connected to the other of the vibration generating portion and the vibration receiving portion;
   an elastic member provided between said inner cylinder and said outer cylinder, and being deformable when vibration is generated;
   a thin rubber membrane being expandably provided on an inner periphery of said outer cylinder;
   at least one main fluid chamber able to expand and contract according to deformation of said elastic member;
   a plurality of auxiliary fluid chambers being partially defined by at least a portion of said thin rubber membrane and being able to expand and contract according to deformation of said thin rubber membrane;
   restricted path means disposed respectively adjacent to said main fluid chamber and said plurality of auxiliary fluid chambers, and being elongated circumferentially at the first and second end portion of said inner cylinder to respectively communicate said main fluid chamber with at least one of said plurality of auxiliary fluid chambers;
   said main fluid chamber and said plurality of auxiliary fluid chambers being provided at an intermediate portion between said restricted path means around said inner cylinder, and disposed circumferentially at different portions of said inner cylinder;
   wherein said main fluid chamber, said auxiliary fluid chambers and said restricted path means are filled with fluid which flows therebetween.

2. A vibration isolation apparatus according to claim 1, wherein said plurality of auxiliary fluid chambers comprise a first auxiliary fluid chamber and a second auxiliary, fluid chamber and are provided around said inner cylinder, and said restricted path means comprises a plurality of restricted paths so as to communicate each of said first auxiliary fluid chamber and said second auxiliary fluid chamber with said main fluid chamber.

3. A vibration isolation apparatus according to claim 2, wherein said first and second auxiliary fluid chambers are able to expand and contract according to deformation of said thin rubber membrane which has respective different rigidities to fluid pressure at portions corresponding to said first and second auxiliary fluid chambers.

4. A vibration isolation apparatus according to claim 3, wherein said plurality of said restricted paths are provided separately at both axial ends of said outer cylinder.

5. A vibration isolation apparatus according to claim 2, wherein said elastic member has a first concave portion and a second concave portion, each of said first concave portion and said second concave portion having openings facing toward the side of said outer cylinder, said second concave portion being disposed on a side opposite to said first concave portion with respect to a predetermined axis of symmetry extending across an axis of said outer cylinder and an axis of said inner cylinder;
   said thin rubber membrane includes at least one diaphragm and at least one rigid membrane portion provided around said inner periphery of said outer cylinder, and said rigid membrane portion is provided around said inner periphery of said outer cylinder on a side opposite to said diaphragm with respect to said axis of symmetry and has a form symmetrical to that of said diaphragm with respect to said axis of symmetry,
   said first auxiliary fluid chamber is disposed on one side with respect to said axis of symmetry, and defined by said diaphragm of said thin rubber membrane and said first concave portion of said elastic member;
   said second auxiliary fluid chamber is disposed on a side opposite to said first auxiliary fluid chamber with respect to said axis of symmetry and is defined by said rigid membrane portion of said thin rubber membrane and said second concave portion.

6. A vibration isolation apparatus according to claim 5, wherein said main fluid chamber is disposed substantially on said axis of symmetry.

7. A vibration isolation apparatus according to claim 5, wherein said first auxiliary fluid chamber operates in a state of a comparatively low frequency of vibration, and said second auxiliary fluid chamber operates in a state of a comparatively high frequency of vibration.

8. A vibration isolation apparatus according to claim 2, wherein said main fluid chamber is connected to said first auxiliary fluid chamber through one of said plurality of restricted paths, and said main fluid chamber is connected to said second auxiliary fluid chamber through another of said plurality of restricted paths.

9. A vibration isolation apparatus according to claim 2, wherein said first auxiliary fluid chamber is connected to said second auxiliary fluid chamber through one of said plurality of restricted paths and said second fluid chamber is directly connected to said main fluid chamber through another of said restricted paths.

10. A vibration isolation apparatus according to claim 1, wherein said plurality of said auxiliary fluid chambers are provided around said inner cylinder, and said restricted path means comprises a plurality of restricted paths communicating said main fluid chamber and said auxiliary fluid chambers in series from said main fluid chamber.

11. A vibration isolation apparatus according to claim 10, wherein said thin rubber membrane becomes more flexible to fluid pressure according to the order of communication from said main fluid chamber.

12. A vibration isolation apparatus according to claim 1, further comprising an intermediate cylinder provided between said inner cylinder and said outer cylinder, and wherein said elastic member is disposed in said intermediate cylinder.

13. A vibration isolation apparatus according to claim 1, further comprising an intermediate cylinder provided between said inner cylinder and said outer cylinder, said intermediate cylinder having at least one end portion, said restricted path means being disposed along a circumference of said intermediate cylinder at said at least one end portion of said intermediate cylinder.

14. A vibration isolation apparatus comprising:
an inner cylinder connected to one of a vibration generating portion and a vibration receiving portion, said inner cylinder having a first and second end portion;
an outer cylinder connected to the other of the vibration generating portion and the vibration receiving portion;
an elastic member provided between said inner cylinder and said outer cylinder, and deforming when vibration is generated;
a main fluid chamber having said elastic member serving as at least a part of a wall thereof, and able to expand and contract;
a plurality of auxiliary fluid chambers communicated with said main fluid chamber and disposed at one side of a predetermined axis of symmetry extending across an axis of said outer cylinder and an axis of said inner cylinder as viewed in an axial direction of said outer cylinder and said inner cylinder, said plurality of auxiliary fluid chambers being defined by said outer cylinder and a first concave portion formed in said elastic member and opening toward a side of said outer cylinder;
restricted path means disposed respectively adjacent to said main fluid chamber and said plurality of auxiliary fluid chambers, and being elongated circumferentially at the first and second end portions of said inner cylinder to respectively communicate said main fluid chamber with at least one of said plurality of auxiliary fluid chambers;
a first membrane being elastically deformable and provided on an inner periphery of said outer cylinder, facing said plurality of auxiliary fluid chambers;
a second concave portion disposed on a side opposite to said first concave portion with respect to said axis of symmetry, and formed in said elastic member and opening toward the side of said outer cylinder; and
a second membrane provided at said outer cylinder on a side opposite to said first membrane with respect to said axis of symmetry, and having a form symmetrical to that of said first membrane with respect to said axis of symmetry;
wherein said main fluid chamber and said plurality of auxiliary chambers are positioned between said restricted path means and disposed circumferentially at different portions of said inner cylinder, and said main fluid chamber and said plurality of auxiliary chambers and said restricted path means are filled with fluid, which flows therebetween.

15. A vibration isolation apparatus according to claim 14, wherein said main fluid chamber is disposed substantially on said axis of symmetry.

16. A vibration isolation apparatus according to claim 15, wherein said plurality of auxiliary fluid chambers comprises a first auxiliary fluid chamber and a second auxiliary fluid chamber, and disposed substantially on said axis of symmetry, and said second auxiliary fluid chamber being in communication with said main fluid chamber.

17. A vibration isolation apparatus according to claim 15, wherein said plurality of auxiliary fluid chambers comprises a first auxiliary fluid chamber and a second auxiliary fluid chamber and disposed substantially on said axis of symmetry, and said first auxiliary fluid chamber and said second auxiliary fluid chamber are in communication with each other.

18. A vibration isolation apparatus comprising:
an inner cylinder connected to one of a vibration generating portion and a vibration receiving portion and having a first and second end portion and a plurality of portions;
an outer cylinder connected to the other of the vibration generating portion and the vibration receiving portion;
an elastic member provided between said inner cylinder and said outer cylinder, and being deformable when vibration is generated, said elastic member having a first concave portion with an opening facing toward a side of said outer cylinder, and a second concave portion disposed on a side opposite to said first concave portion with respect to a predetermined axis of symmetry extending cross an axis of said outer cylinder and an axis of said inner cylinder as viewed in an axial direction of said outer cylinder and said inner cylinder with an opening facing toward the side of said outer cylinder;
a thin rubber membrane being deformable and including a first membrane and a second membrane disposed on an inner periphery of aid outer cylinder;
a main fluid chamber being formed in said elastic member serving as at least a part of a wall thereof, and able to expand and contract;
a plurality of auxiliary fluid chambers comprising a first and second auxiliary chamber, and being capable of expanding and contracting according to deformation of said thin rubber membrane, said plurality of auxiliary fluid chambers being partially defined by aid thin rubber membrane; and
restricted path means positioned respectively adjacent to said main fluid chamber and said plurality of auxiliary fluid chambers, and being elongated circumferentially at the first and second end portions of said inner cylinder to respectively communicate said main fluid chamber with at least one of said plurality of auxiliary fluid chambers,
said first auxiliary fluid chamber communicated with said main fluid chamber through said restricted path means and disposed at on side of said axis of symmetry, said first auxiliary fluid chamber being defined by did outer cylinder and said first concave portion of said elastic member,
said first membrane provided at an inner periphery of said outer cylinder, facing said first auxiliary fluid chamber and being elastically deformable,
said second membrane being more rigid than said first membrane, and provided at said inner periphery of said outer cylinder on a side opposite to said first membrane with respect to said axis of symmetry, and having a form symmetrical to that of said first membrane with respect to said axis of symmetry,
wherein said main fluid chamber and said plurality of auxiliary chambers are disposed circumferentially at different portions of aid inner cylinder, and said main fluid chamber, said plurality of auxiliary chambers and said restricted path means are filled with fluid, which flows therebetween.

19. A vibration isolation apparatus according to claim 18, wherein said main fluid chamber is disposed substantially on said axis of symmetry, and said restricted path means includes a first restricted path and a second restricted path.

20. A vibration isolation apparatus according to claim 19 wherein said restricted path means comprises at least a first restricted path, said second auxiliary fluid chamber is covered by said second membrane and communicated with said main fluid chamber through said first restricted path and disposed substantially on said axis of symmetry.

21. A vibration isolation apparatus according to claim 19, wherein said restricted path means comprises at least a second restricted path, said second auxiliary fluid chamber is covered by said second membrane and communicated with said first auxiliary fluid chamber through said second restricted path and disposed substantially on said axis of symmetry.

* * * * *